US012738673B2

United States Patent
Zhang et al.

(10) Patent No.: US 12,738,673 B2
(45) Date of Patent: Sep. 15, 2026

(54) INTEGRATED BASE STATION ANTENNA

(71) Applicant: Outdoor Wireless Networks LLC, Claremont, NC (US)

(72) Inventors: Xun Zhang, Suzhou (CN); Hangsheng Wen, Suzhou (CN); Yutong Liu, Suzhou (CN); Nengbin Liu, Suzhou (CN)

(73) Assignee: Outdoor Wireless Networks LLC, Richardson, TX (US)

( * ) Notice: Subject to any disclaimer, the term of this patent is extended or adjusted under 35 U.S.C. 154(b) by 43 days.

(21) Appl. No.: 18/925,669

(22) Filed: Oct. 24, 2024

(65) Prior Publication Data

US 2025/0055206 A1 Feb. 13, 2025

Related U.S. Application Data

(63) Continuation of application No. 18/082,715, filed on Dec. 16, 2022, now Pat. No. 12,176,621.

(30) Foreign Application Priority Data

Dec. 23, 2021 (CN) ......................... 202123258716.6

(51) Int. Cl.

| | |
|---|---|
| ***H01Q 21/28*** | (2006.01) |
| ***H01Q 1/24*** | (2006.01) |
| ***H01Q 1/42*** | (2006.01) |
| ***H01Q 5/314*** | (2015.01) |
| ***H01Q 19/10*** | (2006.01) |
| ***H01Q 21/06*** | (2006.01) |
| ***H01Q 21/08*** | (2006.01) |

(52) U.S. Cl.
CPC ............... *H01Q 21/28* (2013.01); *H01Q 1/24* (2013.01); *H01Q 1/246* (2013.01); *H01Q 1/42* (2013.01); *H01Q 5/314* (2015.01); *H01Q 19/10* (2013.01); *H01Q 21/061* (2013.01); *H01Q 21/08* (2013.01)

(58) Field of Classification Search
CPC .......... H01Q 21/28; H01Q 1/24; H01Q 1/246; H01Q 1/42; H01Q 5/314; H01Q 19/10; H01Q 21/061; H01Q 21/08
See application file for complete search history.

(56) References Cited

U.S. PATENT DOCUMENTS 5,691,736 A * 11/1997 Hunn .................... H01Q 1/425 244/121
11,380,983 B2 7/2022 Chen (Continued)

*Primary Examiner* — Hai V Tran
(74) *Attorney, Agent, or Firm* — Myers Bigel, P.A.

(57) ABSTRACT

An integrated base station antenna comprises a passive antenna that includes a front radome, a matching dielectric layer and a rear radome; and an active antenna mounted on the back of the passive antenna. A distance between the rear radome of the passive antenna and the matching dielectric layer is a first distance, and the distance between the active antenna and the rear radome of the passive antenna is a second distance, where the first distance is selected as 0.25+n/2 times the equivalent wavelength, where n is a positive integer, and the second distance is selected as 0.25+N/2 times the equivalent wavelength, where N is a natural number. The equivalent wavelength is within the range of 0.8 to 1.2 times of the wavelength corresponding to a center frequency of an operating frequency band of the radiating elements in the active antenna.

20 Claims, 4 Drawing Sheets

(56) References Cited

U.S. PATENT DOCUMENTS

| | | | | |
|---|---|---|---|---|
| 2010/0309089 | A1* | 12/2010 | Collinson | H01Q 21/064<br>343/872 |
| 2014/0313095 | A1* | 10/2014 | Pu | H01Q 1/246<br>343/836 |
| 2018/0198197 | A1* | 7/2018 | Toyao | H01Q 1/42 |
| 2021/0175617 | A1 | 6/2021 | Chen | |
| 2021/0218156 | A1 | 7/2021 | Patel et al. | |
| 2021/0305717 | A1 | 9/2021 | Hou et al. | |
| 2022/0102842 | A1 | 3/2022 | Li et al. | |
| 2023/0163483 | A1* | 5/2023 | Harel | H01Q 21/26<br>343/853 |

* cited by examiner

INTEGRATED BASE STATION ANTENNA

CROSS-REFERENCE TO RELATED APPLICATIONS

The present application is a continuation of U.S. application Ser. No. 18/082,715, filed Dec. 16, 2022, which itself claims priority to Chinese Patent Application No. 202123258716.6, filed Dec. 23, 2021, the entire contents of both of which are incorporated herein by reference as if set forth fully herein.

FIELD

The present disclosure relates to a communication system, more specifically, it relates to an integrated base station antenna, which includes a passive antenna device and an active antenna device.

BACKGROUND

With the development of wireless communication technology, an integrated base station antenna including a passive antenna device and active antenna device has emerged. The passive antenna device may include one or more arrays of radiating elements that are configured to generate relatively static antenna beams, such as antenna beams that are configured to cover a 120 degree sector (in the azimuth plane) of an integrated base station antenna. The arrays may include arrays that operate, for example, under second generation (2G), third generation (3G) or fourth generation (4G) cellular network standards. These arrays are not configured to perform active beamforming operations, although they typically have remote electronic tilt (RET) capabilities which allow the shape of the antenna beam to be changed via electromechanical means in order to change the coverage area of the antenna beam. The active antenna device may include one or more arrays of radiating elements that operate under fifth generation (5G or higher version) cellular network standards. In 5G mobile communication, the frequency range of communication includes a main frequency band (specific portion of the range 450 MHZ-6 GHz) and an extended frequency band (24 GHz-73 GHz, i.e. millimeter wave frequency band, mainly 28 GHz, 39 GHz, 60 GHz and 73 GHZ). The frequency range used in 5G mobile communication includes frequency bands that use higher frequencies than the previous generations of mobile communication. These arrays typically have individual amplitude and phase control over subsets of the radiating elements therein and perform active beamforming.

As shown in FIG. 1, an integrated base station antenna 10 may include a passive antenna device 11 and an active antenna device 12 mounted on the back of the passive antenna device 11. The passive antenna device 11 includes one or more arrays of radiating elements that are mounted to extend forwardly from a reflector of the passive antenna device 11. The reflector acts to reflect electromagnetic waves that are emitted backwardly by the radiating elements in the forward direction, and the reflector also serves as a ground plane for the radiating elements of the arrays.

The active antenna device 12 is capable of emitting high-frequency electromagnetic waves (for example, high-frequency electromagnetic waves in the 2.3-4.2 GHZ frequency band or a portion thereof). At least a portion of the active antenna device 12 is typically mounted rearwardly of the passive antenna device 11. In order not to hinder the high-frequency electromagnetic waves emitted by the active antenna device 12, the reflector in the passive antenna device 11 is typically provided with a large opening 14. The active antenna device 12 is installed at a position corresponding to the opening so that the high-frequency electromagnetic waves emitted by the active antenna device 12 pass through the opening 14.

In addition to the reflector, the rear radome and front radome of the passive antenna device 11 may also hinder (e.g., reflect), for example, high-frequency electromagnetic waves emitted by the active antenna device 12. Reflection is undesirable. Current countermeasures typically include reducing the dielectric constant of the rear radome and/or front radome of the passive antenna device 11, but such countermeasures increase cost and reduce the strength of the radomes, which is undesirable.

In addition, increasing the available space in the passive antenna device 11 is also desirable.

SUMMARY

The objective of the present disclosure is to provide an integrated base station antenna capable of overcoming at least one drawback in the prior art.

According to a first aspect of the present disclosure, an integrated base station antenna is provided, the integrated base station antenna comprises a passive antenna device that includes a front radome, a matching dielectric layer and a rear radome; and an active antenna device mounted on the back of the rear radome of the passive antenna device, wherein within the region corresponding to the active antenna device, the distance between the rear radome of the passive antenna device and the matching dielectric layer is a first distance, and the distance between the active antenna device and the rear radome of the passive antenna device is a second distance, wherein the first distance is selected as 0.25+n/2 times the equivalent wavelength, where n is a positive integer, and the second distance is selected as 0.25+N/2 times the equivalent wavelength, where N is a natural number, wherein the equivalent wavelength is within the range of 0.8 to 1.2 times of the wavelength corresponding to a center frequency of an operating frequency band of the radiating elements in the active antenna device. Therefore, the performance of the integrated base station antenna will be advantageously enhanced.

In some embodiments, the distance between the matching dielectric layer and the front radome of the passive antenna device is a third distance, which is selected as 0.25+M/2 times the equivalent wavelength, where M is a natural number, in which, the dielectric constant of the matching dielectric layer is larger than the dielectric constant of air.

In some embodiments, the equivalent wavelength is within the range of 0.9 to 1.1 times of the wavelength corresponding to the center frequency.

In some embodiments, the equivalent wavelength is equivalent to the wavelength corresponding to the center frequency.

In some embodiments, the passive antenna device includes a 4G antenna device.

In some embodiments, the active antenna device includes a 5G antenna device.

In some embodiments, radiating elements of the passive antenna device are mounted rearwardly of the matching dielectric layer.

In some embodiments, a reflective strip is mounted rearwardly of the matching dielectric layer, where the reflective strip is arranged lateral to the horizontal direction of the passive antenna device and the radiating elements are mounted on the reflective strip.

In some embodiments, the reflective strip is mounted outside of the region corresponding to the active antenna device.

In some embodiments, the radiating elements of the passive antenna device are low-frequency band radiating elements that are configured to provide services in at least part of the operating frequency band of 617 to 960 MHZ.

In some embodiments, tuning elements used for the active antenna device are mounted in a space between the rear radome of the passive antenna device and the matching dielectric layer, and the tuning elements are directly in front of the active antenna device.

In some embodiments, a portion of the rear radome of the passive antenna device that corresponds to the active antenna device is flat.

According to a second aspect of the present disclosure, an integrated base station antenna is provided, the integrated base station antenna comprises: a passive antenna device that includes a front radome and a rear radome; and an active antenna device that is mounted on the back of the rear radome of the passive antenna device, wherein, within a region corresponding to the active antenna device, the distance between the rear radome of the passive antenna device and the front radome of the passive antenna device is a first distance, and the distance between the active antenna device and the rear radome of the passive antenna device is a second distance, wherein the first distance is selected as 0.25+n/2 times the equivalent wavelength, where n is a positive integer, and the second distance is selected as 0.25+N/2 times the equivalent wavelength, where N is a natural number, where the equivalent wavelength is within the range of 0.8 to 1.2 times a wavelength corresponding to the center frequency of an operating frequency band of radiating elements in the active antenna device.

In some embodiments, the equivalent wavelength is within the range of 0.9 to 1.1 times of the wavelength corresponding to the center frequency.

In some embodiments, the equivalent wavelength is equivalent to the wavelength corresponding to the center frequency.

In some embodiments, a reflective strip is mounted in the passive antenna device, where the reflective strip is arranged lateral to the horizontal direction of the passive antenna device and radiating elements of the passive antenna device are mounted on the reflective strip.

In some embodiments, the reflective strip is mounted outside of the region corresponding to the active antenna device.

In some embodiments, the radiating elements of the passive antenna device are low-frequency band radiating elements that are configured to provide services in at least part of the operating frequency band of 617 to 960 MHZ.

In some embodiments, tuning elements used for the active antenna device are mounted in the passive antenna device directly in front of the active antenna device.

In some embodiments, the rear radome of the passive antenna device is flat.

Figure 1:
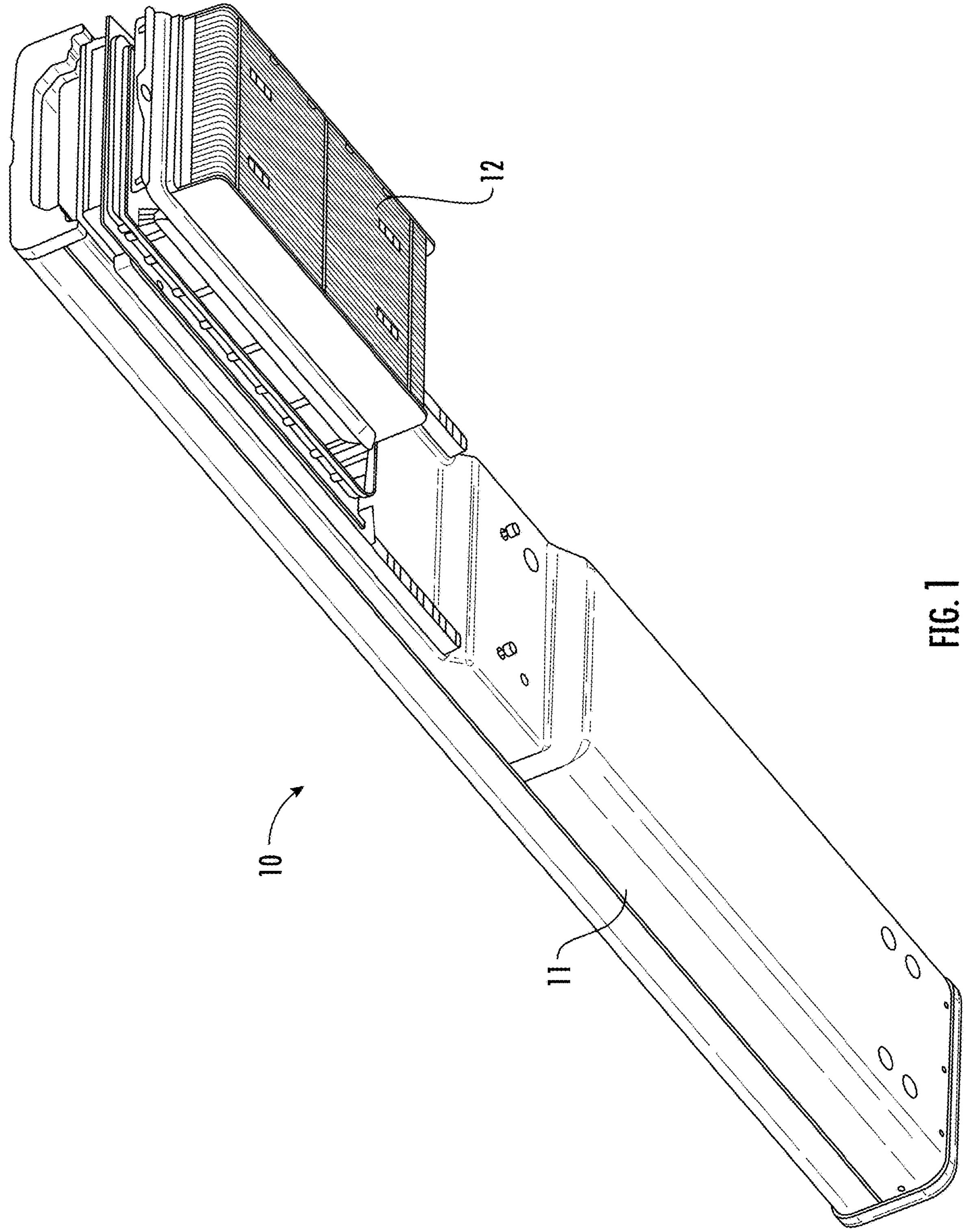
FIG. 1 shows a schematic perspective view of an integrated base station antenna.

Note, in the embodiments described below, the same reference signs are sometimes jointly used between different attached drawings to denote the same parts or parts with the same functions, and repeated descriptions thereof are omitted. In some cases, similar labels and letters are used to indicate similar items. Therefore, once an item is defined in one attached drawing, it does not need to be further discussed in subsequent attached drawings.

For case of understanding, the position, dimension, and range of each structure shown in the attached drawings and the like sometimes may not indicate the actual position, dimension, and range. Therefore, the present disclosure is not limited to the positions, dimensions, and ranges disclosed in the attached drawings and the like.

DETAILED DESCRIPTION

The present invention will be described with reference to the accompanying drawings, which show a number of example embodiments thereof. It should be understood, however, that the present invention can be embodied in many different ways, and is not limited to the embodiments described below. Rather, the embodiments described below are intended to make the invention of the present invention more complete and fully convey the scope of the present invention to those skilled in the art. It should also be understood that the embodiments disclosed herein can be combined in any way to provide many additional embodiments.

The terminology used herein is for the purpose of describing particular embodiments, but is not intended to limit the scope of the present invention. All terms (including technical terms and scientific terms) used herein have meanings commonly understood by those skilled in the art unless otherwise defined. For the sake of brevity and/or clarity, well-known functions or structures may be not described in detail.

Herein, when an element is described as located "on" "attached" to, "connected" to, "coupled" to or "in contact with" another element, etc., the element can be directly located on, attached to, connected to, coupled to or in contact with the other element, or there may be one or more intervening elements present. In contrast, when an element is described as "directly" located "on", "directly attached" to, "directly connected" to, "directly coupled" to or "in direct contact with" another element, there are no intervening elements present. In the description, references that a first element is arranged "adjacent" a second element can mean that the first element has a part that overlaps the second element or a part that is located above or below the second element.

Herein, the foregoing description may refer to elements or nodes or features being "connected" or "coupled" together. As used herein, unless expressly stated otherwise, "connected" means that one element/node/feature is electrically, mechanically, logically or otherwise directly joined to (or directly communicates with) another element/node/feature. Likewise, unless expressly stated otherwise, "coupled" means that one element/node/feature may be mechanically, electrically, logically or otherwise joined to another element/node/feature in either a direct or indirect manner to permit interaction even though the two features may not be directly connected. That is, “coupled” is intended to encompass both direct and indirect joining of elements or other features, including connection with one or more intervening elements.

Herein, terms such as “upper”, “lower”, “left”, “right”, “front”, “rear”, “high”, “low” may be used to describe the spatial relationship between different elements as they are shown in the drawings. It should be understood that in addition to orientations shown in the drawings, the above terms may also encompass different orientations of the device during use or operation. For example, when the device in the drawings is inverted, a first feature that was described as being “below” a second feature can be then described as being “above” the second feature. The device may be oriented otherwise (rotated 90 degrees or at other orientation), and the relative spatial relationship between the features will be correspondingly interpreted.

Herein, the term “A or B” used through the specification refers to “A and B” and “A or B” rather than meaning that A and B are exclusive, unless otherwise specified.

The term “exemplary”, as used herein, means “serving as an example, instance, or illustration”, rather than as a “model” that would be exactly duplicated. Any implementation described herein as exemplary is not necessarily to be construed as preferred or advantageous over other implementations. Furthermore, there is no intention to be bound by any expressed or implied theory presented in the detailed description.

Herein, the term “substantially”, is intended to encompass any slight variations due to design or manufacturing imperfections, device or component tolerances, environmental effects and/or other factors. The term “substantially” also allows for variation from a perfect or ideal case due to parasitic effects, noise, and other practical considerations that may be present in an actual implementation.

Herein, certain terminology, such as the terms “first”, “second” and the like, may also be used in the following description for the purpose of reference only, and thus are not intended to be limiting. For example, the terms “first”, “second” and other such numerical terms referring to structures or elements do not imply a sequence or order unless clearly indicated by the context.

Further, it should be noted that, the terms “comprise”, “include”, “have” and any other variants, as used herein, specify the presence of stated features, steps, operations, elements, and/or components, but do not preclude the presence or addition of one or more other features, steps, operations, elements, components, and/or groups thereof.

The base station antenna is an elongated structure that extends along a longitudinal axis. The base station antenna may have a tubular shape with a generally rectangular cross-section. The base station antenna may include a front radome, a rear radome, a top end cap and a bottom end cap which includes a plurality of connectors mounted therein. The base station antenna is typically mounted in a substantially vertical configuration (i.e., the longitudinal axis may be generally perpendicular to a plane defined by the horizon when the base station antenna is under normal operation).

Figure 2:
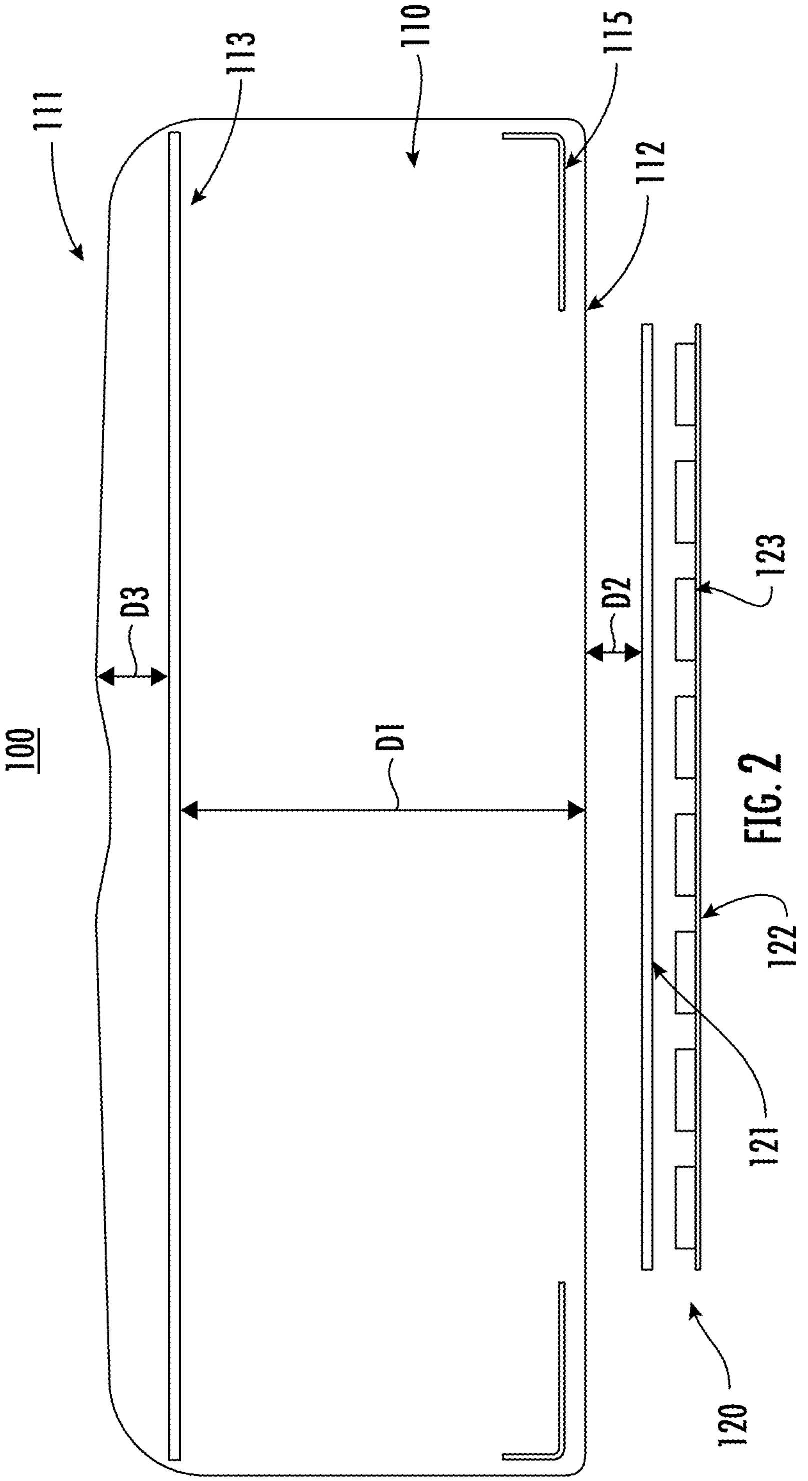
FIG. 2 shows a schematic bottom view of an integrated base station antenna according to some embodiments of the present disclosure.

Referring to FIG. 2, a schematic bottom view of an integrated base station antenna 100 according to some embodiments of the present disclosure is shown. The integrated base station antenna 100 may include a passive antenna device 110 and an active antenna device 120 mounted behind the rear radome of the passive antenna device 110.

The passive antenna device 110 may include a front radome 111, a rear radome 112 and one or more arrays (not shown in FIG. 2) of radiating elements located between the front radome and rear radome. These arrays are mounted to extend forwardly from a reflector of the passive antenna device 110 and these arrays may include arrays that operate under second generation (2G), third generation (3G) or fourth generation (4G) cellular network standards. The front radome 111 and the rear radome 112 of the passive antenna device 110 may be formed as an integrated radome or the front radome 111 and the rear radome 112 may be formed as separate radome components.

The active antenna device 120 may include its own front radome 121 and one or more arrays 123 of radiating elements located behind the front radome. These arrays are mounted to extend forwardly from the reflector 122 of the active antenna device 120 and these arrays may include arrays that operate under fifth generation or next generation (5G or 6G) cellular network standards. In 5G mobile communication, the frequency range of communication includes a main frequency band (specific portion of the range 450 MHZ-6 GHZ) and an extended frequency band (24 GHZ-73 GHZ, i.e. millimeter wave frequency band, mainly 28 GHz, 39 GHz, 60 GHz and 73 GHZ).

Dielectric materials that form the radome (such as front radome and/or rear radome) of the passive antenna device 110 typically have frequency selectivity to electromagnetic waves. The higher the frequency of the electromagnetic waves, the greater the effect of the dielectric materials thereon, such as poorer transmittance and higher reflectivity. Poorer transmittance may cause the signal strength of the electromagnetic waves to be reduced, thereby causing the gain of the base station antenna to be reduced. The higher the reflectivity, the more the electromagnetic waves are reflected by the radome and these reflected waves superimpose with the electromagnetic waves radiated by the radiating elements, which cause jitters and ripples in the radiation pattern. These are undesirable effects.

In order to compensate the adverse effects of the radome of the passive antenna device 110, such as the front radome 111, on the electromagnetic waves from the active antenna device 120, a matching dielectric layer 113 may be provided in the passive antenna device 110, where the matching dielectric layer 113 may be arranged between the radiating element array of the passive antenna device and the front radome. The matching dielectric layer 113 may have a certain thickness and dielectric constant, and the dielectric constant of the matching dielectric layer 113 is larger than the dielectric constant of air. Design personnel may adjust the reflection of the electromagnetic waves from the active antenna device 120 by designing the thickness and dielectric constant of the matching dielectric layer 113 such that these reflected waves superimpose out of phase and even anti-phase to reduce the reflectivity of the entire radome, thereby allowing the reflectivity and transmittance of the entire radome to meet the design goals. Specific design parameters of the matching dielectric layer 113 are not limited herein. It should be understood that in some embodiments, the matching dielectric layer 113 may also not be provided.

Nonetheless, the high-frequency electromagnetic waves emitted by the active antenna device 120 must go through at least four dielectric layers, namely the front radome 121 of the active antenna device 120, rear radome 112 of the passive antenna device 110, the matching dielectric layer 113 and the front radome 111 of the passive antenna device 110. In order to further reduce the adverse effects, such as reflection, on the electromagnetic waves from the active antenna device 120 caused by the passive antenna device 110, the present disclosure provides a new design for the layout of the passive antenna device 110 and active antenna device 120.

Referring to FIG. 2, differing from traditional design forms, where the active antenna device 120 is embedded into the passive antenna device 110, the rear radome of the passive antenna device 110 no longer has a concave shape for accommodating the active antenna device 120 and instead may be basically flat in some embodiments. Within the region corresponding to the active antenna device 120, the distance between the rear radome of the passive antenna device 110 and the matching dielectric layer 113 is up to a first distance D1, and the distance between the active antenna device 120, such as the front radome thereof, and the rear radome of the passive antenna device 110 is up to a second distance D2. The first distance may be selected as 0.25+n/2 times that of the equivalent wavelength, where n is a positive integer (such as 1, 2, 3, 4, . . . ) and the second distance may be selected as 0.25+N/2 times of the equivalent wavelength, where N is a natural number (such as 0, 1, 2, . . . ). The equivalent wavelength is associated with a wavelength corresponding to the center frequency of the operating frequency band of the radiating elements in the active antenna device 120, such as the theoretical wavelength in an air medium or in vacuum. In other words, the selection of the first distance D1 and the second distance D2 in the passive antenna device 110 is related to the operating frequency band of the radiating elements in the active antenna device 120. By selecting an appropriate distance, the reflection of the electromagnetic waves from the active antenna device 120 by the passive antenna device 110 may be effectively reduced.

Advantageously, the distance between the matching dielectric layer 113 and the front radome of the passive antenna device 110 may be up to a third distance D3, which may be selected as 0.25+M/2 times the equivalent wavelength, where M is a natural number (such as 0, 1, 2, . . . ).

In some embodiments, the equivalent wavelength may be within the range of 0.8 to 1.2 times the wavelength corresponding to the center frequency. In some embodiments, the equivalent wavelength may be within the range of 0.9 to 1.1 times the wavelength corresponding to the center frequency. In some embodiments, the equivalent wavelength may be equivalent to the wavelength corresponding to the center frequency.

As an example, where the operating frequency band of the radiating elements in the active antenna device 120 is 2.2-4.2 GHZ, the center frequency may be selected as 3.2 GHZ. The wavelength corresponding to the center frequency may be approximately 90 mm. When the equivalent wavelength is equivalent to the wavelength corresponding to the center frequency, the first distance D1 may be 67.5 mm (n=1), 112.5 mm (n=2), 157.5 mm (n=3) . . . 67.5+(n−1)*45 mm, and the specific size may be determined based on actual needs. At the same time, the second distance D2 may be selected as 22.5+N*45 mm, and the third distance D3 may be selected as 22.5+M*45 mm. Typically, in order to reduce the size of the base station antenna, N and M may be selected as 0.

It should be understood that as the front radomes 111 and 121, rear radome 112 and matching dielectric layer 113 may not be flat throughout, only the distance within a partial area may be considered (such as the range corresponding to the active antenna device 120), for example, the average distance.

It should be understood that the aforementioned matching dielectric layer 113 does not necessarily have to be provided. In some embodiments, the integrated base station antenna 100 does not include the matching dielectric layer 113 and as such, the layout parameters may be set as follows: Within the region corresponding to the active antenna device 120, the distance between the rear radome 111 of the passive antenna device 110 and the front radome 112 of the passive antenna device 110 is up to the first distance, and the distance between the active antenna device 120, such as the front radome 121 thereof, and the rear radome 112 of the passive antenna device 110 is up to the second distance, in which, the first distance is selected as 0.25+n/2 times of the equivalent wavelength, where n is a positive integer and the second distance is selected as 0.25+N/2 times of the equivalent wavelength, where N is a natural number.

Figure 3:
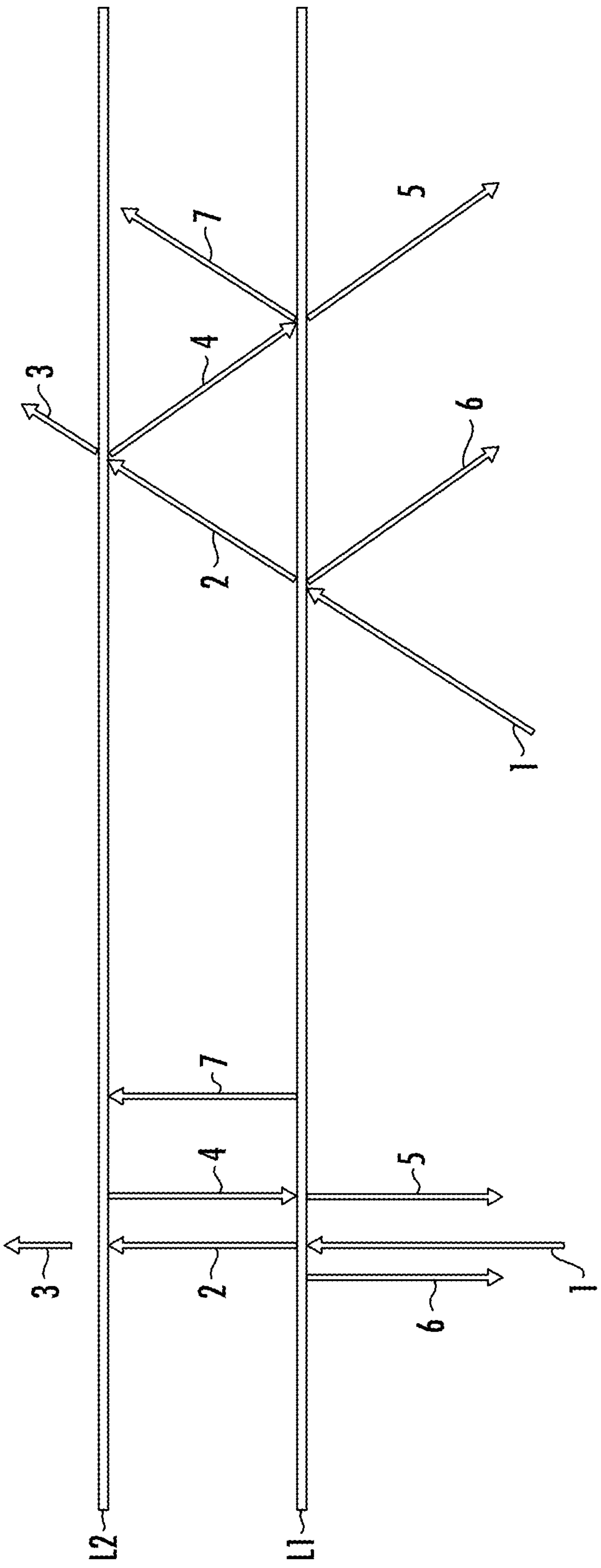
FIG. 3 shows a design schematic diagram for which the layout design of the integrated base station antenna in FIG. 2 may be based.

The theoretical analysis of the layout design of the integrated base station antenna 100 in FIG. 2 will be described with reference to FIG. 3. FIG. 3 shows the transmission process of radio frequency signal 1 between two dielectric layers with different incident angles, respectively, in which, the distance between the two dielectric layers is selected as one-quarter of the equivalent wavelength, i.e. ¼λ. When the radio frequency signal 1 is transmitted through the first dielectric layer at phase 0 deg and a specific angle, sub-radio frequency signal 2 transmits through the first dielectric layer, and sub-radio frequency signal 6 is reflected by the first dielectric layer L1 (the phase of the sub-radio frequency signal 6 is still 0 deg); when radio frequency signal 2 is transmitted through ¼λ, and is transmitted through the second dielectric layer L2 at a phase of −90 deg, sub-radio frequency signal 3 transmits through the first dielectric layer L1 and sub-radio frequency signal 4 is reflected by the second dielectric layer L2 (the phase of the sub-radio frequency signal 4 is still −90 deg); when the reflected sub-radio frequency signal 4 is transmitted through ¼λ and is transmitted through the first dielectric layer at a phase of −180 deg, sub-radio frequency signal 5 transmits through the first dielectric layer, and sub-radio frequency signal 7 is reflected by the first dielectric layer. Ultimately, based on pure theoretical analysis, these reflected sub-radio frequency signal 5 and sub-radio frequency signal 6 may have a phase difference of 180 deg such that these reflected signals superimpose out of phase and even anti-phase to reduce reflectivity.

It should be understood that when the distance between two dielectric layers is selected as 0.25+n/2 times the equivalent wavelength, the aforementioned effects may similarly be applicable. For this, design personnel may consider the requirements on the size of the base station antenna while adjusting the distance between two adjacent dielectric layers such that these reflected waves superimpose out of phase and even anti-phase to reduce the reflectivity in the entire transmission process, thereby allowing the reflectivity and transmittance of high-frequency electromagnetic waves to meet the design goals.

Figure 4:
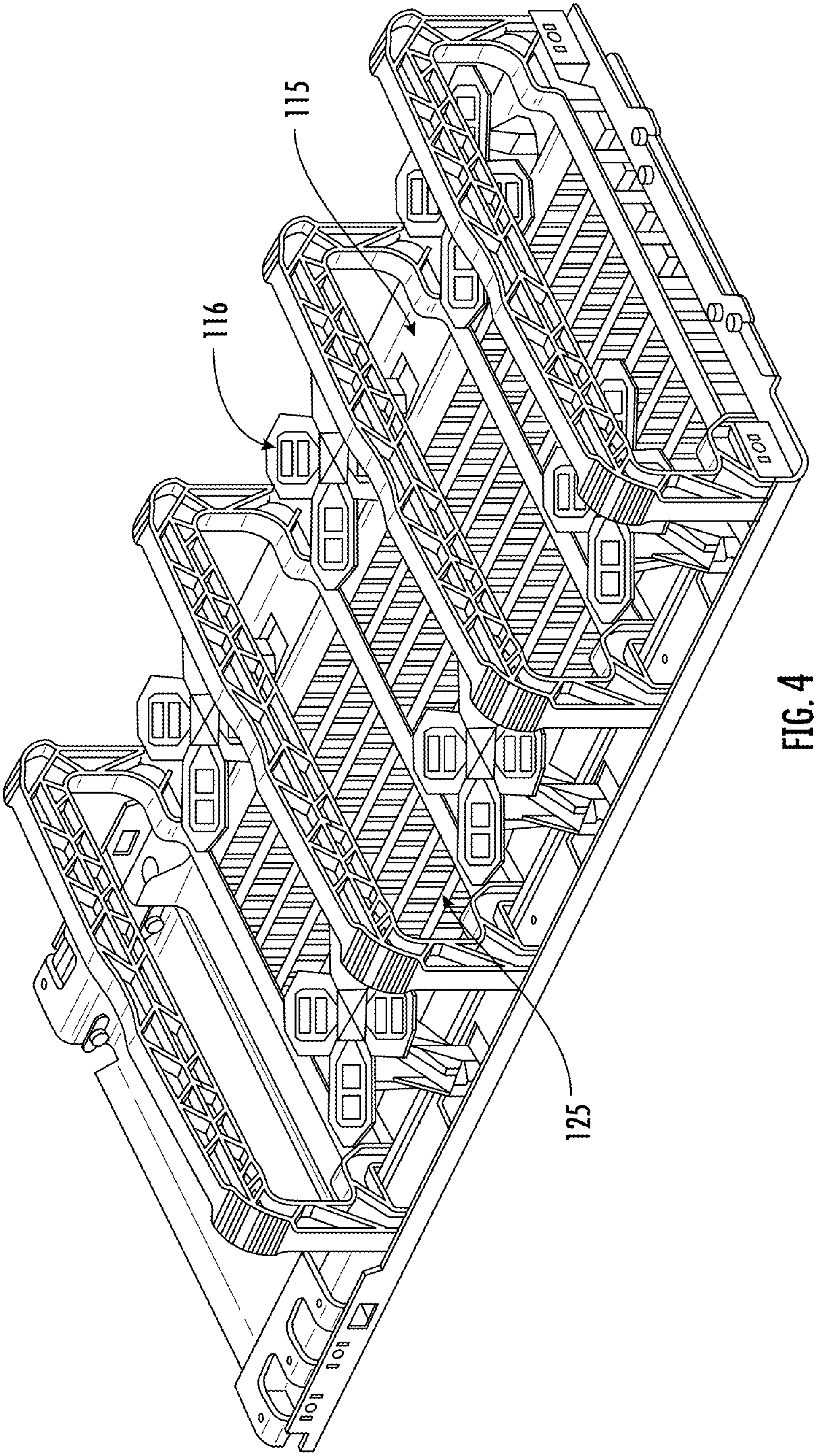
FIG. 4 shows a partial perspective view of the integrated base station antenna in FIG. 2.

Referring to FIG. 4, a partial perspective view of an integrated base station antenna 100 according to some embodiments of the present disclosure is shown. Different radio frequency elements may be mounted in the passive antenna device 110. These radio frequency elements may, for example, be mounted in the space between the rear radome 112 of the passive antenna device 110 and the matching dielectric layer 113. These different radio frequency elements may be configured to be used for the passive antenna device 110 and may also be configured to be used for the active antenna device 120.

In some embodiments, the reflector in the passive antenna device is provided with a very large opening (refer to FIG.

1). The active antenna device is mounted at a position corresponding to the opening so that the high-frequency electromagnetic waves emitted by the active antenna device pass through the opening. Nonetheless, a reflective strip 115 may also be mounted outside of the corresponding range of the active antenna device 120, i.e. outside of the opening, where the reflective strip 115 is arranged lateral to the horizontal direction of the passive antenna device 110 and radiating elements used for the passive antenna device 110 are mounted on the reflective strip 115. As shown in FIG. 4, two reflective strips 115 lateral to the passive antenna device 110 are mounted with the corresponding low-frequency band radiating elements 116, respectively, which for example, may be configured to provide services in at least part of the operating frequency band of 617 to 960 MHZ.

In some embodiments, limited by the size of the active antenna device 120, tuning elements 125 of the active antenna device 120 may also be mounted inside the passive antenna device 110. Based on the layout design in the passive antenna device 110, the internal space thereof is greatly increased. For this, a plurality of tuning element 125 arrays may be provided to tune the radiation performance of the high-frequency electromagnetic waves. As shown in FIG. 4, in the passive antenna device 110, the area directly in front of the active antenna device 120 is mounted with a plurality of columns of tuning elements 125 used for the active antenna device 120.

It should be understood that other types and radiating elements of other effects may be conceived to improve the space utilization rate of the integrated base station antenna.

Although some specific embodiments of the present disclosure have been described in detail through examples, those skilled in the art should understand that the above examples are only for illustration rather than for limiting the scope of the present disclosure. The embodiments disclosed herein can be combined arbitrarily without departing from the spirit and scope of the present disclosure. Those skilled in the art should also understand that various modifications can be made to the embodiments without departing from the scope and spirit of the present disclosure. The scope of the present disclosure is defined by the attached claims.

What is claimed is:

1. An integrated base station antenna, comprising:

a passive antenna that includes a front radome, a rear radome, a first array of radiating elements that are mounted in between the front radome and the rear radome, and a dielectric layer that is mounted in between the first array of radiating elements and the front radome and spaced apart from both the front radome and the first array of radiating elements; and an active antenna that includes a second array of radiating elements mounted behind the passive antenna, wherein a dielectric constant of the dielectric layer is greater than the dielectric constant of air.

2. The integrated base station antenna of claim 1, wherein the dielectric layer is a flat dielectric layer.

3. The integrated base station antenna of claim 1, wherein a first distance between the dielectric layer and the rear radome is selected based on an operating frequency band of the second array of radiating elements.

4. The integrated base station antenna of claim 3, wherein a second distance between the dielectric layer and the front radome is also selected based on the operating frequency band of the second array of radiating elements.

5. The integrated base station antenna of claim 1, wherein a second operating frequency band of the second array encompasses higher frequencies than a first operating frequency band of the first array.

6. The integrated base station antenna of claim 1, wherein the passive antenna includes a reflector that has an opening, and the second array of radiating elements is configured to emit electromagnetic waves through the opening.

7. The integrated base station antenna of claim 1, wherein the passive antenna further includes a plurality of tuning elements that are mounted in a space between the rear radome and the dielectric layer, where the tuning elements are directly in front of the active antenna.

8. The integrated base station antenna of claim 7, wherein the tuning elements are configured to tune a radiation performance of the second array of radiating elements.

9. The integrated base station antenna of claim 1, wherein a portion of the rear radome that is in front of the active antenna is flat.

10. An integrated base station antenna, comprising:

a passive antenna that includes a front radome, a rear radome, a matching dielectric layer and a plurality of first radiating elements that are mounted behind the front radome;

an active antenna that includes a plurality of second radiating elements, the active antenna mounted on a rear side of the passive antenna, wherein at least one of a first distance between the rear radome and the matching dielectric layer and a second distance between the matching dielectric layer and the front radome is pre-selected to reduce reflection by the passive antenna of electromagnetic waves emitted by the plurality of second radiating elements.

11. The integrated base station antenna of claim 10, wherein both the first distance and the second distance are pre-selected to reduce reflection by the passive antenna of electromagnetic waves emitted by the plurality of second radiating elements.

12. The integrated base station antenna of claim 10, wherein a dielectric constant of the matching dielectric layer is greater than the dielectric constant of air.

13. The integrated base station antenna of claim 12, wherein the matching dielectric layer is a flat layer.

14. The integrated base station antenna of claim 12, wherein the passive antenna includes a reflector that has an opening, and the plurality of second radiating elements are configured to emit electromagnetic waves through the opening.

15. The integrated base station antenna of claim 12, wherein the passive antenna further includes a plurality of tuning that are mounted in a space between the rear radome and the dielectric layer, where the tuning elements are directly in front of the active antenna.

16. The integrated base station antenna of claim 15, wherein the tuning elements are configured to tune a radiation performance of the plurality of second radiating elements.

17. The integrated base station antenna of claim 12, wherein a portion of the rear radome that is in front of the active antenna is flat.

18. An integrated base station antenna, comprising:

a passive antenna that includes a front passive antenna radome, a rear passive antenna radome, a matching dielectric layer that has a dielectric constant that is greater than the dielectric constant of air, and a first array radiating elements that is mounted behind the front passive antenna radome; and an active antenna that includes a second array of radiating elements and a front active antenna radome, the active antenna mounted on a rear side of the passive antenna so that the front active antenna radome is in between the rear passive antenna radome and the second array of radiating elements, wherein a front surface of the front active antenna radome is mounted rearwardly of the entirety of the rear passive antenna radome.

19. The integrated base station antenna of claim 18, wherein the matching dielectric layer is mounted in between the first array of radiating elements and the front radome and spaced apart from both the front radome and the first array of radiating elements.

20. The integrated base station antenna of claim 18, wherein the matching dielectric layer is configured to cause first electromagnetic waves that are transmitted by the second array of radiating elements that are reflected by one of the front passive antenna radome, the rear passive antenna radome and the active antenna front radome to superimpose out-of-phase with second electromagnetic waves that are transmitted by the second array of radiating elements that are reflected by a different one of the front passive antenna radome, the rear passive antenna radome and the active antenna front radome.

* * * * *